April 1, 1947.    C. A. ROBINSON ET AL    2,418,140
FASTENING INSERTING MECHANISM
Filed April 18, 1945    4 Sheets-Sheet 2
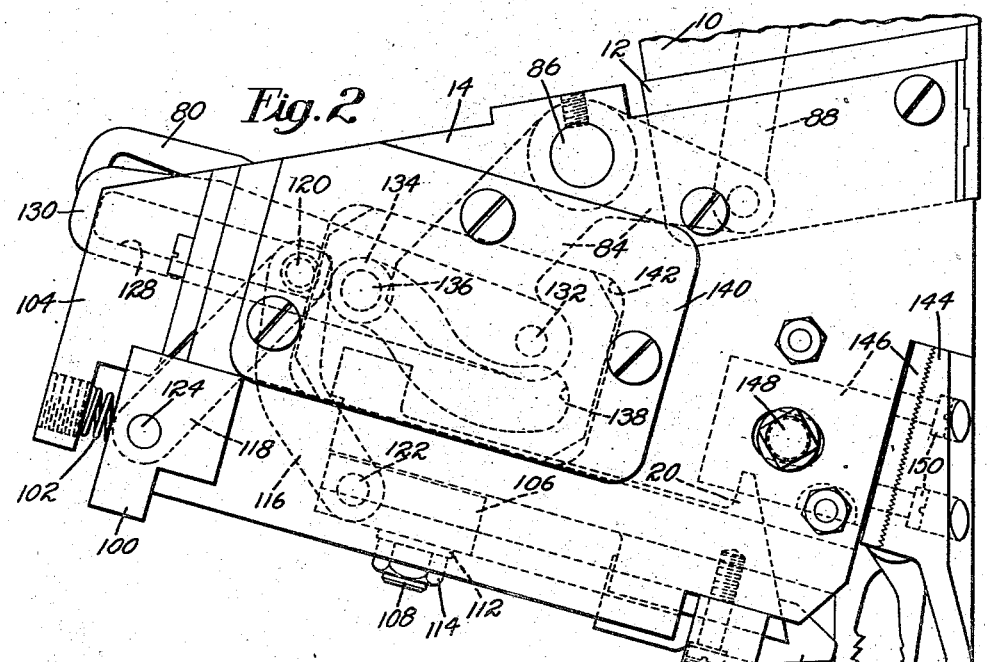
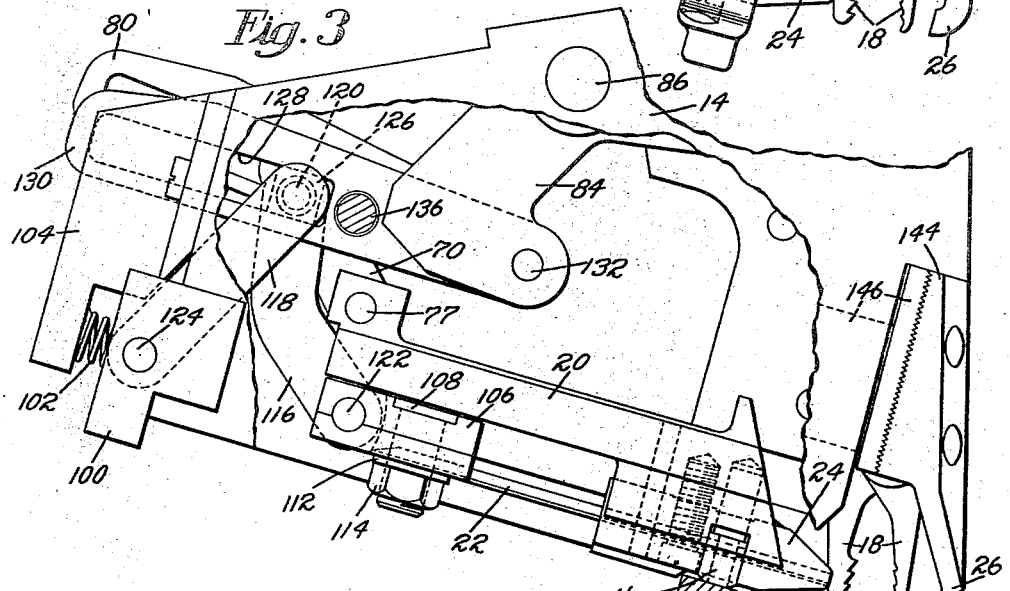
Inventors
Charles A. Robinson
Herman A. Imhof
By their Attorney

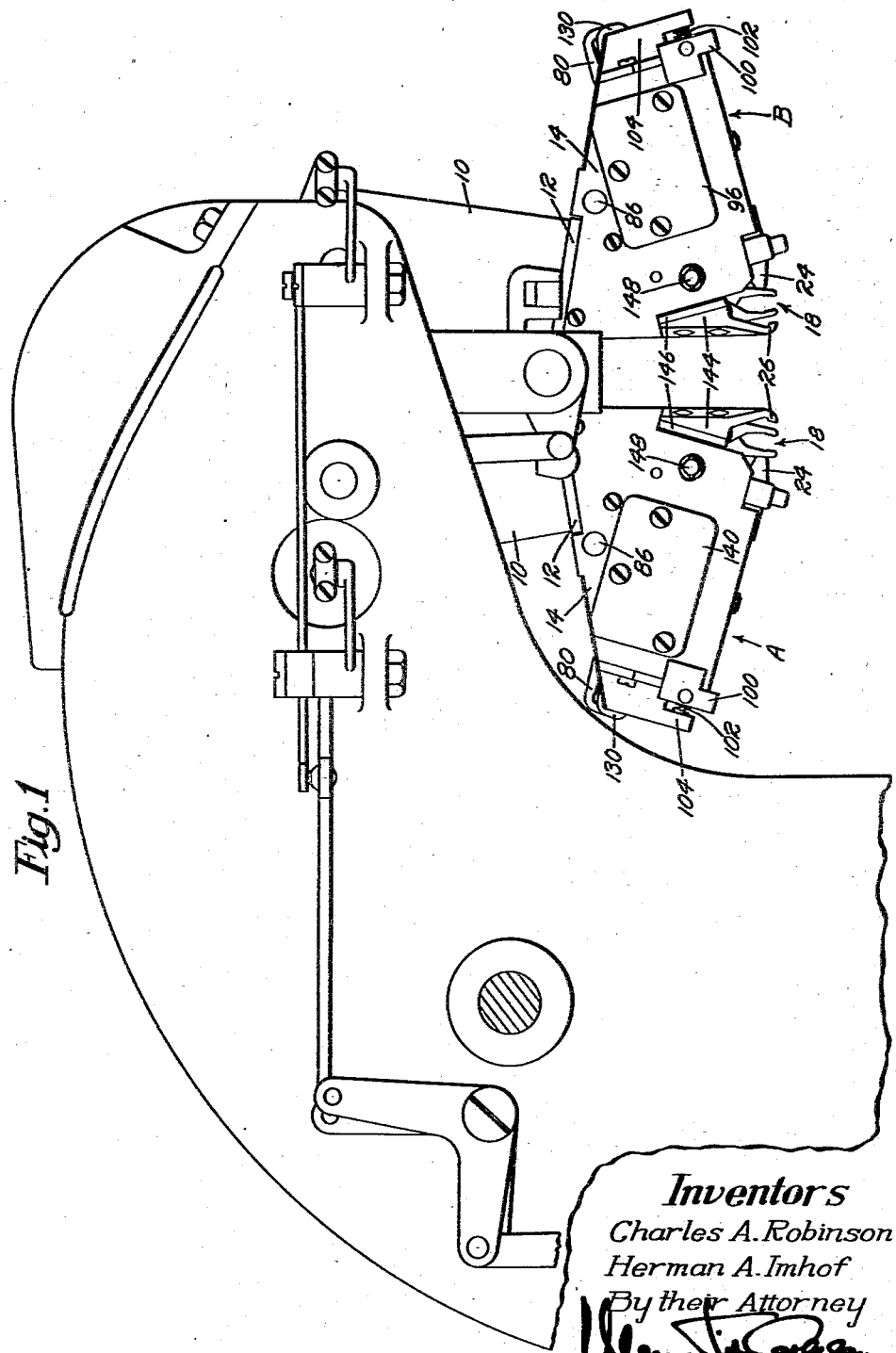

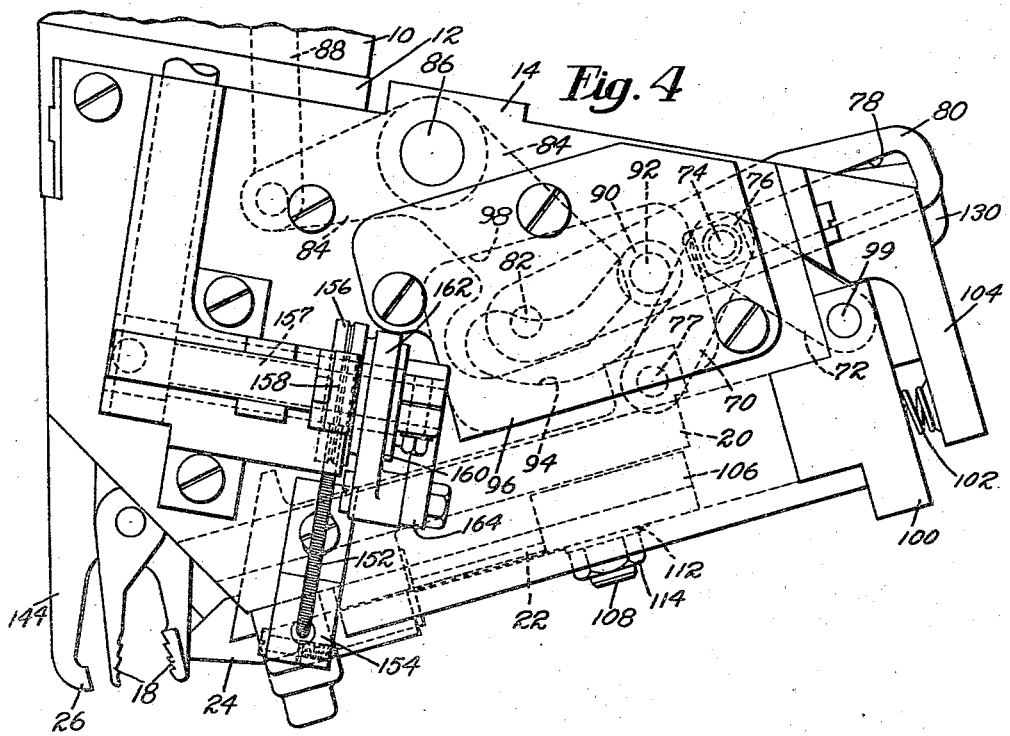
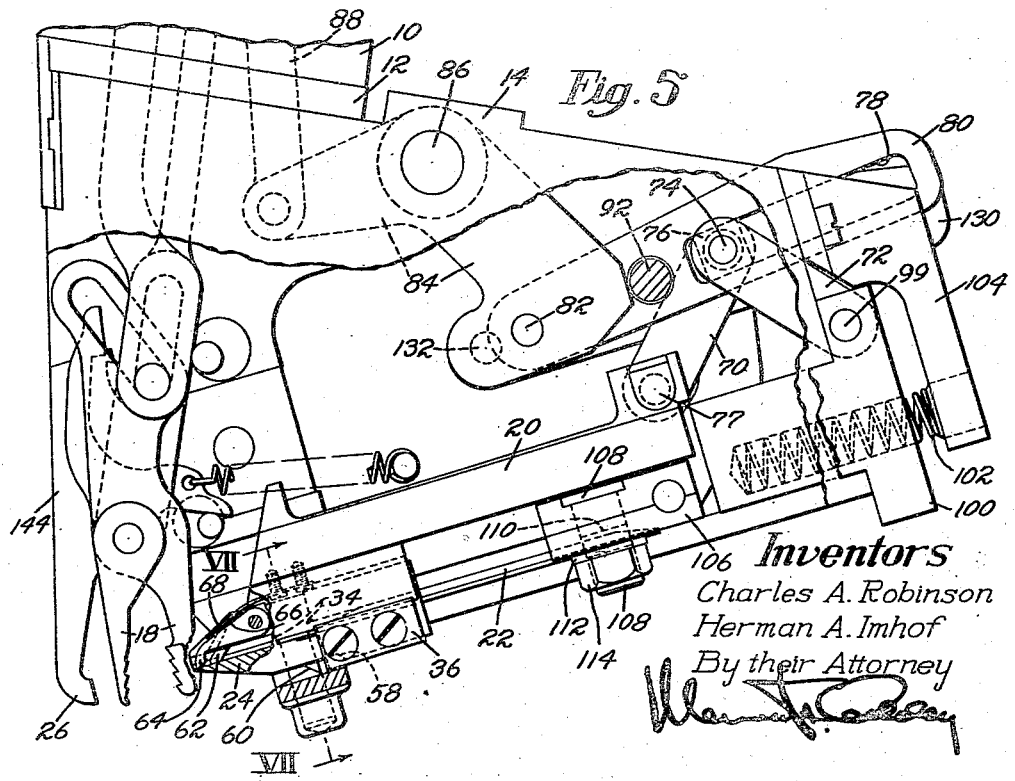

April 1, 1947.    C. A. ROBINSON ET AL    2,418,140
FASTENING INSERTING MECHANISM
Filed April 18, 1945    4 Sheets-Sheet 4
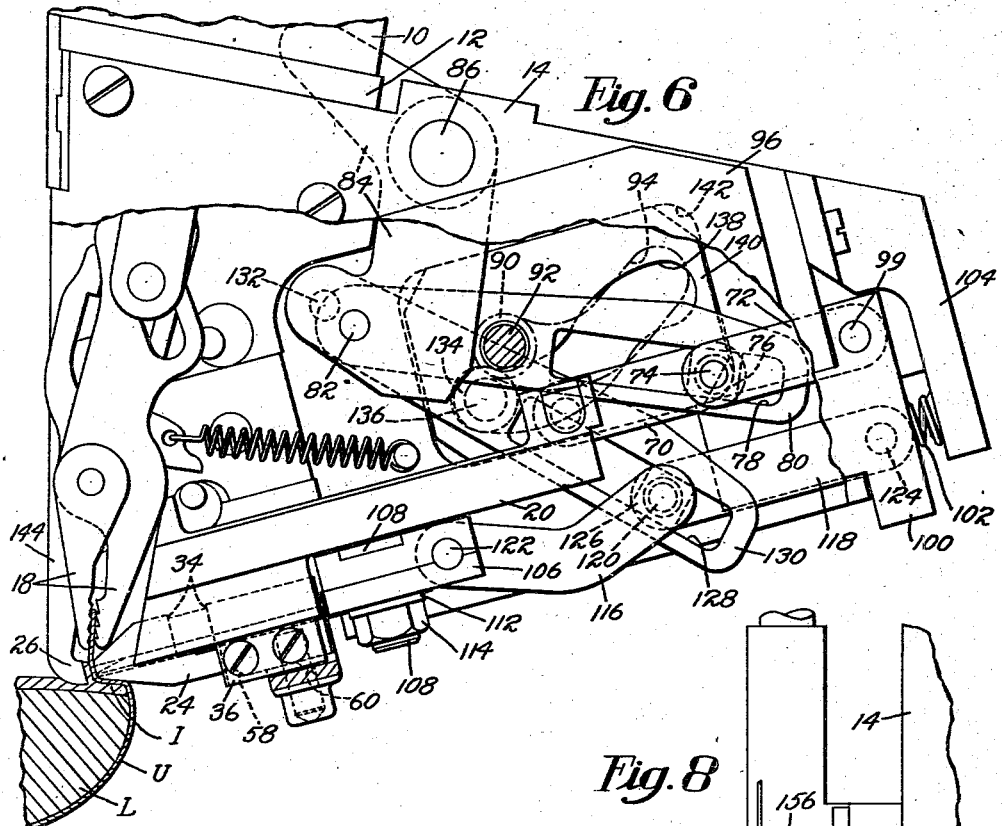
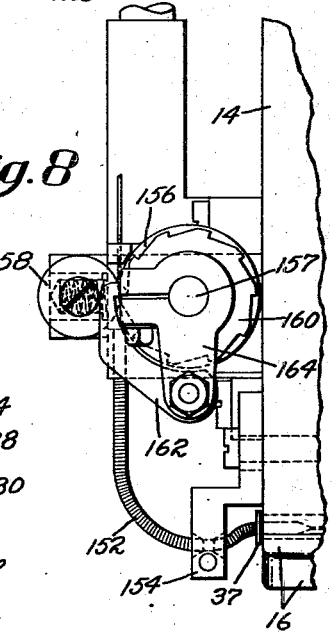
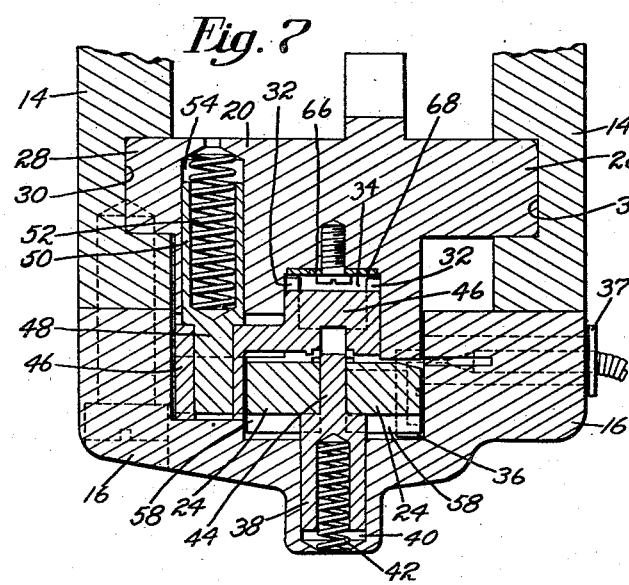
Inventors
Charles A. Robinson
Herman A. Imhof
By their Attorney Patented Apr. 1, 1947

2,418,140

UNITED STATES PATENT OFFICE 2,418,140

FASTENING INSERTING MECHANISM

Charles A. Robinson, Salem, and Herman A. Imhof, Beverly, Mass., assignors to United Shoe Machinery Corporation, Flemington, N. J., a corporation of New Jersey Application April 18, 1945, Serial No. 588,974

12 Claims. (Cl. 1—20)

This invention relates to fastening inserting mechanisms and is illustrated herein as embodied in a shoe lasting machine of the type disclosed in United States Letters Patent No. 2,201,866, granted May 21, 1940, on an application filed in the name of Robert H. Lawson. It should be understood, however, that the invention is not limited in its utility to embodiment in lasting machines of this type, since it may be utilized to advantage in other types of lasting machines and, indeed, in fastening inserting machines for performing operations other than lasting.

It is an object of this invention to provide an improved fastening inserting mechanism, particularly a staple forming and driving mechanism such as is adapted for use in a machine of the type mentioned. Specifically, it is desired to provide a fastening inserting mechanism of simple construction but dependable operation by which the fastenings, such as staples, are inserted uniformly by the driver in spite of varying thicknesses of the work pieces and resulting varying operative or work engaging positions assumed by the staple guiding throat member or nozzle with which mechanisms of this type are usually provided. Another object of the invention is to reduce breakage of machine parts, due to the lodging of crippled staples in the nozzle, to an absolute minimum and to provide mechanism for safely ejecting crippled staples from the nozzle.

To this end and in accordance with the invention, the throat member with its nozzle, and the driver are operated by toggles which in turn are actuated by a single member, the arrangement being such that the ends of the toggles opposite to those connected to the throat member and the driver respectively are connected to a member normally held stationary in the mechanism but adapted to be moved by either toggle either to adjust the driver operating toggle in accordance with the position of the throat member as determined by the thickness of the part of the work piece operated on, or to withdraw the throat member from engagement with the work and with relation to the driver if the driver is unable to complete its operative stroke due to the presence of a crippled staple in the throat or nozzle, thus ejecting the crippled staple.

These and other features of the invention will now be described in detail with reference to the accompanying drawings, and will be pointed out in the appended claims.

In the drawings,

Fig. 1 is a view in left hand side elevation of the head of an automatic shoe side lasting machine in which the present invention is shown as embodied;

Fig. 2 is a view in left hand side elevation of the left hand lasting unit illustrated in Fig. 1;

Fig. 3 is a view similar to Fig. 2 with certain machine parts broken away;

Fig. 4 is a view in right hand side elevation of the lasting unit illustrated in Fig. 2;

Fig. 5 is a view similar to Fig. 4 with certain machine parts broken away;

Fig. 6 is a view similar to Fig. 5 illustrating the machine parts in a position which they assume at the conclusion of a fastening inserting operation;

Fig. 7 is a section on the line VII—VII of Fig. 5; and

Fig. 8 is an end view of a wire feeding mechanism.

The invention, which relates to a novel fastening forming and inserting device, is illustrated herein as embodied in a machine for automatically and simultaneously lasting both sides of a shoe, the machine being of the type illustrated in United States Letters Patent No. 2,201,866, referred to above. Only so much of this machine is shown herein as is necessary for an understanding of the invention. The machine is constructed and arranged to operate simultaneously upon the opposite sides of an upper U (Fig. 6) of a shoe mounted on a last L, the latter carrying on its bottom a sole member, such as a ribbed or lipped insole I, commonly used in the manufacture of welt shoes. Accordingly, the machine is provided with two individual operating units A and B (Fig. 1), hereinafter termed "lasting units," having means for working the upper U at the opposite sides of the shoe over the last L and inwardly over the insole I and for securing the marginal portion of the shoe upper in lasted relation to the insole I. Since both lasting units A and B are substantially alike, it is sufficient to describe only one of them in detail. In particular, the following description is that of the lasting unit A. Each lasting unit comprises upper tensioning mechanism, including a lasting gripper, and staple forming and inserting mechanism. As in the machine of the aforementioned patent, each lasting unit is carred by a cylindrical support (not shown) positioned in a sleeve 10 (Figs. 1, 2, 4 to 6). More specifically, the just mentioned cylindrical support has secured to its lower end a flanged member 12 provided with opposite plane side faces to which are secured two spaced side plates 14 (Fig. 7) constituting the main portion of the frame of the lasting unit. The lower ends of the side plates 14 are connected together by a yoke member 16. Thus the side plates 14 and the yoke member 16 form a box-like structure within which the upper tensioning mechanism and the staple forming and inserting mechanism are housed.

The upper tensioning mechanism, as already stated, including a lasting gripper 18 (Figs. 1 to 6), is substantially the same as that fully shown and described in the aforementioned patent.

The staple forming and inserting mechanism comprises a movable throat member 20 (Figs. 2 to 7), including staple forming and guiding members, and a staple inserting member or driver 22 which is movable in the throat member 20. The throat member 20 has secured to it a throat piece or nozzle 24 and is reciprocated to move the nozzle into and out of engagement with the work. More specifically, on movement of the throat member 20 toward the work, the nozzle 24 is caused to engage the marginal portion of the upper after the upper has been tensioned over the last and while it is held tensioned by the gripper 18, and to wipe the upper margin inwardly over the feather portion of the insole I and to press it against the upstanding rib or lip of the insole, as illustrated in Fig. 6, preparatory to the insertion of a staple through the upper margin and rib so as to secure the upper in lasted relation to the insole. The rib is backed and supported at each side of the shoe by an anvil 26, to be described, against which the staple legs are clenched after the staple has been inserted through the upper margin and the insole lip. Moreover, the anvils 26, in contacting the inner face of the insole rib, serve to position the shoe with relation to the lasting and fastening inserting instrumentalities of the lasting units.

To guide the throat member 20 (and nozzle 24 which may be considered a part of it) during its movement toward and from the work, it is provided with lateral flanges 28 (Fig. 7) which extend into guideways 30 provided in the inner walls of the side plates 14. The mechanism for moving the throat member will be described later.

The nozzle 24 is in the shape substantially of a rectangular block from which rise two spaced parallel guide flanges 32 (Fig. 7) fitting in a recess provided in the throat member 20 and beveled off at their forward ends. The flanges 32 are not continuous in view of the provision of a recess 34 (Figs. 5 and 6) in which the staple is formed from a piece of wire fed into the recess by mechanism, to be described, and after the length of wire fed into the recess has been severed from the strand of wire by a knife 36 (Figs. 5 to 7) which is bolted to the nozzle 24 and cooperates in shear-like fashion with the inner end of a wire intake and guiding member 37 (Fig. 7) mounted and secured in a transverse bore provided in the yoke member 16. The wire intake member has a wire guiding passage through it. When the parts are in their initial retracted positions (Figs. 3, 4 and 5), the wire is fed in transversely to the path of movement of the nozzle 24 through the recess 34 between a vertically movable so-called inside former 38 and the rear wall of the recess. Into the recess 34 at the rear end thereof leads a driver guiding passage having a cross section of an inverted T, the passage being continued in the outlet end of the nozzle 24. The inside former 38 is a sleeve-like member which is vertically slidable in a cup 40 formed in the center portion of the yoke member 16. A spring 42 backs the inside former 38 and thus tends to elevate it so as to cause the upper stem-like extension 44 of the inside former 38 to extend through a slot in the nozzle 24 into the recess 34. Moreover, located in the recess 34 is a vertically movable filler piece 46 adapted to support and guide the staple legs after the staple has been formed. The filler piece 46 is spring pressed downward. To this end a stem 48 is driven into a bore of the filler piece 46. The stem has a sleeve-like upper extension 50 in which is seated a spring 52. The extension 50 is slidable in a bore 54 provided in the throat member 20. The upper end of the spring 52 bears against the upper end of the bore 54. However, the filler piece 46 is normally held in a raised position by a cam 56 (Fig. 3) provided on the yoke member 16 and adapted to engage the filler piece 46.

On forward movement of the throat member 20 and the nozzle 24, after a length of wire has been fed into the recess 34, the knife 36 is caused to sever this length of wire from the wire strand, then the severed wire is bent around the inside former 38 by the nozzle 24 which engages the wire at the forward end of the driver passage at the rear end of the recess 34. The recess 34 is of sufficient width to provide room for the swinging of the staple legs during the formation of the staple, the staple being drawn into the driver passage at the rear of the recess 34. Continued forward movement of the throat member 20 and the nozzle 24 causes the filler piece 46 to ride off the cam 56 and to drop into the recess 34. The filler piece 46, as illustrated in Fig. 7, is provided at its lower surface with a recess adapted to provide a continuous passage for the staple and the driver. The staple is now ready to be driven by the driver 22, save that the inside former 38 is still in the way of the staple and has to be depressed. To accomplish this the nozzle 24 is provided with a cam 58 (Figs. 5 to 7) which cooperates with a cam face 60 on the inside former 38. Thus, on continued forward movement of the throat member 20 and the nozzle 24, the inside former 38 is cammed down and no longer obstructs the movement of the staple toward the work.

To prevent the staple legs from collapsing, particularly on impingement of the staple against the work surface, they are supported at their inner sides by two fingers 62 and 64 (Fig. 5) which are pivotally secured in the nozzle 24 and are depressed by flat springs 66 and 68 secured to the throat member 20. The front ends of the fingers 62 and 64 are arranged in staggered relation in the line of drive, with the result that the staple legs are supported at their inner sides from the beginning to the end of the staple driving operation. As the staple bar connecting both staple legs successively passes the fingers 62 and 64, each finger is cammed out of the way by the bar.

To move the throat member 20 and the nozzle 24 with the results described, there is provided a toggle comprising a front link 70 and a rear link 72 (Figs. 4 to 6). The toggle links 70 and 72 are joined by a center bolt 74 carried by a movable block 76. The front link 70 is pivotally secured at 77 to a lug on the throat member 20. The block 76 is mounted to slide along a guideway 78 provided in a lever 80 pivotally secured by a pin 82 to a bell crank lever 84. The bell crank lever 84 is mounted for rocking movement on a rod or shaft 86, the two ends of which are fixed in the two side plates 14, and is actuated by a link 88 (Figs. 2 to 5) which is the same as the corresponding link for actuating the staple forming and driving mechanism disclosed in the aforementioned patent and which imparts to the bell crank lever 84 oscillations of constant length.

To time and to control the movement of the lever 80, it carries a roll 90 on a stud 92, the roll engaging in a cam groove 94 cut into the inner face of a plate 96 which fits into a cutout portion or window 98 provided in the right hand side plate 14. The rear link 72 of the above-mentioned toggle is pivotally secured at 99 to a block 100 which is movably mounted between the rear ends of the two side plates 14 and which is normally held against movement by a spring 102. The spring is located in a bore provided in the block 100 and its rear end bears against a bracket 104 bolted to the rear ends of the side plates 14. It will be understood that, upon actuation of the bell crank lever 84 by the link 88 in a clockwise direction as viewed in Figs. 4 and 5, the lever 80 is moved forwardly and swung downwardly about its pivot pin 82, its downward movement being timed and controlled by the roll 90 in accordance with the configuration of the cam groove 94 to move the toggle 70, 72 out of the broken position, illustrated in Figs. 4 and 5, into the extended position, illustrated in Fig. 6. As a result of this movement of the toggle, the throat member 20 and the nozzle 24 are advanced toward the work. This causes the nozzle 24 to wipe the tensioned margin of the upper inwardly over the feather portion of the insole and to press it against the upstanding rib of the insole, the rib and the margin of the upper finally being compressed between the front end of the nozzle 24 and the anvil 26. In this operative position of the nozzle 24, provided stock of normal thickness is being operated on, there is a clearance of approximately $\tfrac{1}{16}$ of an inch between the nozzle 24 and the anvil 26. However, if substantially heavier stock is encountered, movement of the toggle 70, 72 into its extended position causes a rearward movement of the block 100 against the pressure of the spring 102. In this case, the nozzle 24 engages the work before the toggle is fully extended and the further movement of the toggle, after the nozzle has engaged the work, causes the described rearward movement of the block 100. This rearward movement of the block 100 is of a predetermined amount and corresponds substantially to the difference between the thicknesses of heavy stock and average stock.

The driver 22 is supported in and actuated by a slide 106 having lateral flanges extending into slideways provided in the inner faces of the side plates 14. Machined into the under surface of the slide 106 is a guideway shaped to accommodate the driver 22 which has a cross section of an inverted T. However, the guideway in the slide 106 is so shaped that the lower portion of the driver when mounted in the guideway is not flush with the under surface of the slide 106 but protrudes somewhat therefrom, this for a purpose to be presently described. To clamp the driver 22 to the slide 106 the latter has a heightwise extending bore in which is received a screw bolt 108 the head of which is slabbed off at opposite sides so as to fit a rectangular recess provided in the top face of the slide 106, this to prevent rotation of the bolt 108. The bolt 108 has a radially extending bore in its stem through which bore the driver 22 extends. Carried on the lower portion of the screw bolt 108 is a washer 112 engaging the protruding lower portion of the driver and a nut 114 which serves to clamp the driver against the slide 106. The advantage of this arrangement is that the driver may be reversed, in the sense that either end of the driver may be utilized as the operative end engaging and driving the staple into the work. Thus the life span of the driver 22 may be doubled.

To actuate the slide 106 and thereby the driver 22, there is provided a toggle comprising a front link 116 and a rear link 118 (Figs. 2 and 3), both links being joined by a center bolt 120. The front link 116 is pivotally secured by a pin 122 to the slide 106 and the rear link 118 is pivotally secured by a pin 124 to the previously mentioned block 100 which, as described, also carries the rear pivot of the toggle 70, 72 actuating the throat member 20. The center bolt 120 of the toggle 116, 118 is carried in a block 126 which is movable in a guideway 128 provided in a lever 130 pivotally secured at 132 to the previously mentioned bell crank lever 84 which also serves to actuate the toggle 70, 72. Thus the bell crank lever 84 constitutes a single actuating member for operating both toggles 70, 72 and 116, 118, and thus for operating the throat member 20 and the driver 22. As will be described the toggles are successively operated so as to advance first the throat member and then the driver. To time and to control the movement of the lever 130, it carries a roll 134 on a stud 136, the roll engaging a cam groove 138 of a predetermined configuration provided in the inner face of a plate 140 which fits into a window-like opening 142 out into the left hand side plate 14.

The timing of the two swinging levers 80 and 130, which are actuated by the bell crank lever 84 and which in turn serve to operate the throat actuating toggle 70, 72 and the driver actuating toggle 116, 118, is such, due to the configurations of the cam grooves 94 and 138, that the throat member 20 together with the nozzle 24 is moved first and that the movement of the driver 22 is not initiated until the inside former 38 has become depressed. The movement of the driver continues after the nozzle 24 has firmly engaged the work so as to insert the staple previously formed in the nozzle 24.

It has been pointed out that if the nozzle 24 in its movement into operative position comes to rest at a point which is located more than $\tfrac{1}{16}$ of an inch from the clenching surface of the anvil 26, due to an increase in thickness of the insole rib and upper margin, the block 100 carrying the rear end of the throat actuating toggle 70, 72 is moved rearwardly. Since the same block 100 also carries the rear end of the driver actuating toggle 116, 118, the driver actuating toggle is thus adjusted or shifted rearwardly, with the result that upon movement of the driver actuating toggle 116, 118 into extended position, the forward end of the driver nevertheless moves to the same point with relation to the nozzle 24, preferably to the very end of the nozzle 24. In other words, regardless of the position the throat member 20 and nozzle 24 may assume by reason of different thicknesses of the work, the driver is constrained always to move to the end of the nozzle 24 on its operative stroke. The driver moves neither beyond nor short of the end of the nozzle.

A further advantage of this arrangement is to be seen in the following facts. If, after the nozzle 24 has been moved into engagement with the work and the driver has begun its operative stroke, the staple for some reason becomes crippled in the nozzle 24, the breakage of machine parts by the driver tending to move to the end of its stroke, is avoided in that the driver actuating toggle 116, 118, as soon as considerable resistance is offered to the forward movement of the driver, pushes the block 100 rearwardly thereby retracting, through the agency of the toggle 70, 72, the throat member 20 and the nozzle 24 with relation to the driver and causing the crippled staple to be expelled from the nozzle 24. When this happens the toggle 70, 72 is moved beyond its dead center position, shown in Fig. 6, thus accelerating the retraction of the nozzle 24. The same action takes place if the staple on entering the work meets considerable resistance, such as, for example, if the staple should hit a pulling-over tack. In this case, again, the throat member 20 and nozzle 24 will be retracted under the control of the driver actuating toggle 116, 118.

The previously mentioned anvil 26 is formed on a support 144 (Figs. 2 to 6) provided with serrations on its rear face which are in engagement with serrations on the front face of a block 146 mounted for sliding movement forwardly and rearwardly of the lasting unit in the left hand side plate 14 and secured in adjusted position by a locking bolt 148. The support is adjustable heightwise of the machine with relation to the block 146 and also parallel to the line of feed of the work and it is held in adjusted position by screws 150 (Fig. 2) securing the support 144 to the block 146. The adjustment of the block 146 forwardly and rearwardly of the lasting unit causes a corresponding adjustment of the entire anvil mechanism transversely of the line of feed. It will be seen that accordingly the anvil 26 is adjustable in three different directions.

The previously mentioned wire feeding mechanism corresponds substantially to the wire feeding mechanism disclosed in United States Letters Patent No. 1,854,204, granted April 19, 1932, on an application filed in the name of Robert H. Lawson. Connected to the previously mentioned wire intake and guiding member 37 is a flexible wire conduit 152 (Figs. 4 and 8) which passes through a wire straightening device 154 of conventional form. The wire feeding mechanism which serves to advance the wire intermittently comprises a wire feeding roll 156 having a V-shaped wire guiding groove in its perimeter and being mounted to rotate loosely on a shaft 157 rotatable in suitable bearings provided in the machine frame. With the wire feed roll 156 cooperates a pressure roll 158 and the wire strand which is coiled up on a reel (not shown) suitably supported on the machine frame, is passed between the two rolls 156, 158. The feed roll 156 is intermittently rotated forwardly by a ratchet 160 fast on or integral with the roll 156. A pawl 162, carried by an arm 164 fixed to the shaft 157, is caused to engage the teeth of the ratchet 160 and intermittently to advance the ratchet in a manner well known in the art, thereby intermittently rotating the feed roll 156 to feed a length of wire into the nozzle 24 of the lasting unit.

In the operation of the illustrated machine, a work piece comprising a last L with a shoe upper U mounted thereon and carrying on its bottom a lipped insole I is so presented to both lasting units A and B that the anvils 26 of both units engage the opposite inner faces of the insole lips at both sides of the insole. Preferably, the insole lips are thus engaged at the shank portion of the insole whence the lasting operation proceeds toward the toe end of the insole. Prior to the initiation of the lasting operation the marginal portions of the upper, at opposite sides of the shank portion of the insole, are inserted into the open lasting grippers 18. The shoe is then lasted automatically and simultaneously at both sides. Since the operations of both lasting units A and B are the same, it may suffice to describe that of only one of the units. As the upper is being tensioned by the gripper, the wire feeding mechanism illustrated in Fig. 8 advances a length of wire into the recess 34 of the nozzle 24, whereupon the throat member 20 is advanced toward the work, this by the initiation of a swinging movement of the bell crank lever 84 in a clockwise direction, as viewed in Figs. 4 and 5, and the corresponding actuation of the toggle 70, 72. As a result of this movement of the throat member 20 and the nozzle 24 connected thereto, the knife 36 is first caused to sever the fed-in length of wire from the wire strand, whereupon this length of wire is bent about the inside former 38 by the advancing nozzle 24 to form a staple. After the depression of the inside former 38 by the cam 58 of the nozzle 24, the nozzle is caused to engage the margin of the upper which is still held tensioned by the gripper 18 and to wipe that margin over the feather portion of the insole and work it against the insole lip. In the meantime the filler piece 46 has been permitted to drop into its staple supporting and guiding position by reason of the fact that the filler piece, which is constrained to move with the throat member 20, has moved off the cam 56. Substantially at the time when the inside former 38 is fully depressed, the forward or operative movement of the driver 22 is initiated by the toggle 116, 118, the actuation of which is delayed with relation to the actuation of the toggle 70, 72, albeit operated by the same bell crank lever 84, due to the different configurations of the cam grooves 94 and 138 controlling the timing and movements of the levers 80 and 130 actuating the toggles 70, 72 and 116, 118 respectively. The driver 22 on its operative stroke moves through the driver passage provided in the nozzle 24 into engagement with the bar of the formed staple contained therein and drives that staple out of the nozzle through the upper margin and insole lip. The staple legs, when emerging from the inner face of the insole lip, are clenched by the anvil 26 in the conventional manner.

As stated above, the normal clearance between the front end of the nozzle 24, when in its operative staple inserting position, and the opposite end face of the anvil 26 is about $\tfrac{1}{16}$ inch which corresponds to somewhat less than the average combined thickness of the stock comprising the insole lip and upper margin. If the stock should be substantially thicker the nozzle 24 comes to a stop earlier in its cycle than when operating on stock of normal thickness, and continued movement of the toggle 70, 72 into extended position causes a rearward displacement of the block 100 a predetermined amount, with the result that the driver actuating toggle 116, 118 is adjusted rearwardly a corresponding amount by such further or continued movement of the toggle 70, 72 and with the further result that the driver always terminates its driving stroke with its front end flush with the front end of the nozzle. This insures that the staple is properly inserted at any time regardless of the position of the nozzle, precluding any possibility that the staple is driven either too deeply into the work or not sufficiently deep. Furthermore, it is to be noted that not only is the driver actuating toggle 116, 118 controlled by the toggle 70, 72 that operates the throat member 20 and nozzle 24 to determine the operative movement of the driver in accordance with the position of the throat member 20 and nozzle 24, but reversely the toggle 70, 72 and thus the position of the throat member and nozzle may be controlled by the toggle 116, 118 when the driver 22 meets with unusual resistance during its driving stroke. Such resistance may be due to the fact that the staple has become lodged or crippled in the nozzle or that the staple legs, in leaving the nozzle, impinge upon an impenetrable object, such as, for example, a pulling-over tack in the shoe. In either instance the staple is caused to curl up and form a so-called plug which usually becomes wedged in the front end of the nozzle and thus is apt to lead to a breakage of the driver or some part of the nozzle due to the impact of the driver on the plug. In the illustrated lasting unit, however, the breakage of the driver or any other machine part, on formation of a plug in the nozzle, is prevented in that the impact of the driver on the plug results in a rearward displacement of the block 100 with which the driver is connected by the toggle 116, 118, terminating the forward movement of the driver and quickly withdrawing the nozzle 24 and throat member 20 through the agency of the toggle 70, 72 connecting the throat member with the block 100, the toggle, as explained, not only moving bodily but being broken downward, thus accelerating the retraction of the nozzle. The plug thus is ejected from the nozzle receding from the plug which, having sharp corners, usually becomes somewhat embedded in the work and adheres to the work surface from where it may be easily removed thereafter.

Regardless as to whether the staple is properly driven into the work or has become crippled and is ejected from the nozzle, the throat member 20 with the nozzle 24 and the driver 22 are thereafter returned into their initial positions by the movement of their respective toggles into their broken positions due to a reverse swinging movement of the bell crank lever 84 (in a counterclockwise direction as viewed in Fig. 6) preparatory to an initiation of a new cycle of operations.

Having thus described our invention, what we claim as new and desire to secure by Letters Patent of the United States is:

1. In a fastening inserting machine, the combination with work positioning means, of mechanism for driving a fastening into the work, said mechanism including a throat member movable into engagement with the work for guiding the fastening, a driver for driving the fastening, toggles associated respectively with said throat member and driver for operating them, and a single actuating member having a constant stroke for operating both toggles.

2. In a fastening inserting machine, the combination with work positioning means, of mechanism for driving a fastening into the work, said mechanism including a throat member movable into engagement with the work for guiding the fastening, a driver for driving the fastening, toggles associated respectively with said throat member and driver for operating them, a single actuating member having a constant stroke for operating both toggles, and independently moving members connecting said actuating member to each of said toggles.

3. In a fastening inserting machine, the combination with work positioning means, of mechanism for driving a fastening into the work, said mechanism including a throat member movable into engagement with the work for guiding the fastening, a driver for driving the fastening, toggles associated respectively with said throat member and driver for operating them, a single actuating member having a constant stroke for operating both toggles, levers connecting said actuating member to said toggles, and cam means for controlling the motion of said levers when operated by said actuating member.

4. In a fastening inserting machine, the combination with work positioning means, of mechanism for driving a fastening into the work, said mechanism including a throat member movable into engagement with the work for guiding the fastening, a driver for driving the fastening, toggles associated respectively with said throat member and driver for operating them, a single actuating member having a constant stroke for operating both toggles, a pair of levers pivotally secured to said actuating member and provided with guideways, blocks carrying the center joints of said toggles and arranged for movement along the guideways of said levers, and cam means for controlling the timing and extent of motion of said levers when operated by said actuating member.

5. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, means for controlling said driver operating toggle by said first named toggle to determine the operative movement of the driver in accordance with the position of the throat member, and an actuating member for both toggles by which the operations of the toggles are successively initiated.

6. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, means under control of said driver operating toggle for withdrawing the throat member from engagement with the work whenever the driver meets unusual resistance on its operative stroke.

7. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, means under control of said driver operating toggle for withdrawing the throat member from engagement with the work whenever the driver on its operative stroke strikes upon a crippled fastening that has become lodged in the throat thus expelling the crippled fastening from the throat.

8. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, and a connection between said toggles movable by either toggle either to adjust the driver operating toggle in accordance with the position of said throat member or to withdraw the throat member from engagement with the work whenever the driver is unable to complete its operative stroke due to some obstruction in the throat.

9. In a fastening inserting machine, the combination with work positioning means, of a driver for driving a fastening into the work, a throat member movable to a position determined by its engagement with the work for guiding the fastening, a toggle for thus moving the throat member, said toggle being further movable to a predetermined limit after the engagement of the throat member with thick work, another toggle for operating the driver also movable to a predetermined limit, means for adjusting the driver operating toggle by such further movement of the first named toggle to determine the limit of the operative movement of the driver in accordance with the position of the throat member, and a rocking member for operating both toggles.

10. In a fastening inserting machine, the combination with work positioning means, of a driver for driving a fastening into the work, a throat member movable to a position determined by its engagement with the work for guiding the fastening, a toggle for thus moving the throat member, said toggle being further movable to a predetermined limit after the engagement of the throat member with thick work, another toggle for operating the driver also movable to a predetermined limit, a member movable by the throat operating toggle a distance determined by the position of the throat member after it has engaged the work, a connection between the driver operating toggle and said movable member arranged to adjust the driver operating toggle by such further movement of the first named toggle to determine the limit of the operative movement of the driver in accordance with the position of the throat member, and a rocking lever having a constant stroke for operating both toggles.

11. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, a connection between said toggles, and spring means for normally holding said connection stationary in the machine, said connection being movable by the first named toggle on movement of the throat member into engagement with thick work.

12. In a fastening inserting machine, the combination with work positioning means, of a driver for driving a fastening into the work, a throat member movable to a position determined by its engagement with the work for guiding the fastening, a toggle for thus moving the throat member, another toggle for operating the driver, a connection between said toggles, and spring means for normally holding said connection stationary in the machine, said connection being movable by the driver operating toggle so as to withdraw the throat member from engagement with the work through the agency of the first named toggle.

CHARLES A. ROBINSON.
HERMAN A. IMHOF.